United States Patent

Shimizu et al.

[11] Patent Number: 5,107,953
[45] Date of Patent: Apr. 28, 1992

[54] MUFFLER

[75] Inventors: Tetsuo Shimizu, Yokosuka; Rikio Kuroda, Sagamihara, both of Japan

[73] Assignee: Nippon Petrochemicals Co., Ltd., Tokyo, Japan

[21] Appl. No.: 465,229
[22] PCT Filed: Mar. 1, 1989
[86] PCT No.: PCT/JP89/00213
§ 371 Date: Mar. 6, 1990
§ 102(e) Date: Mar. 6, 1990
[87] PCT Pub. No.: WO90/00674
PCT Pub. Date: Jan. 25, 1990

[30] Foreign Application Priority Data

Jul. 15, 1988 [JP] Japan ................ 63-174983

[51] Int. Cl.$^5$ .................................... F01N 7/18
[52] U.S. Cl. ..................... 181/282; 181/255; 181/269
[58] Field of Search ............. 181/244, 246, 249, 255, 181/265, 269, 282

[56] References Cited

U.S. PATENT DOCUMENTS 3,220,507  11/1965  Jettinghoff ................ 181/265
4,122,914  10/1978  Suyama ................ 181/265 X

FOREIGN PATENT DOCUMENTS 55-75521   6/1980  Japan .
59-155528  9/1984  Japan .
63-168429 12/1988  Japan .

*Primary Examiner*—Brian W. Brown
*Attorney, Agent, or Firm*—Scully, Scott, Murphy & Presser

[57] ABSTRACT

A light-weight and tough muffler having a high noise deadening effect characterized in that the outer barrel (I) of the muffler is made of a thermotropic liquid crystal polymer. An example of said polymer is a wholly polyester having monomer units represented by general formula (I):

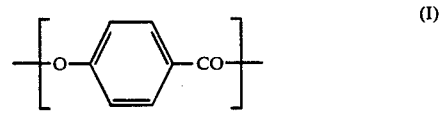

(I)

This polymer may contain 10 to 60 wt. % of inorganic additives such as glass fibers or carbon fibers.

5 Claims, 1 Drawing Sheet

MUFFLER

FIELD OF ART

The present invention relates to a muffler for muffling the exhaust noise from combustion engines such as automobiles.

BACKGROUND ART

It has heretofore been tried to produce mufflers using synthetic resins for overcoming the drawbacks of metallic mufflers such as heavy weight and corrosion. However, none of such synthetic resin mufflers are satisfactory yet. For example, a synthetic resin muffler reinforced by carbon fibers or glass fibers or a muffler having an outer shell formed of a synthetic resin is disclosed in Japanese Patent Laid-Open No. 75521/1980. But normal heat-resistant temperature of the synthetic resins proposed heretofore are lower than 150° C. Besides, since these resins are thermosetting resins, it is impossible to adopt an efficient munufacturing method such as injection molding. Further, it is required as an essential condition to use a heat insulating material between such outer shell and an end member. In the event of heat transfer to the outer shell, the outer shell will be thermally deteriorated and no longer fulfil its function as a muffler.

DISCLOSURE OF THE INVENTION

Having therefore made extensive studies about a muffler of light weight and superior in heat resistance and service life to the conventional mufflers, the present inventors accomplished the present invention.

The present invention will be described in detail hereinunder. The present invention is concerned with a muffler characterized by having an outer shell formed of a thermotropic liquid crystal polymer.

The "thermotropic liquid crystal polymer" as referred to herein indicates a thermoplastic, meltable polymer which exhibits optical anisotropy when melted. Such a polymer which exhibits optical anisotropy when melted possesses the property that the molecular chains of the polymer in a melted state are arranged regularly in paralled. The property of the optical anisotropic melt phase can be confirmed by the conventional polarization test method using an orthogonal polarizer.

The thermotropic liquid crystal polymer is prepared from a monomer which is generally elongated, flat, highly rigid along the molecular long chain, and has a plurality of elongated chain bonds which are either coaxial or parallel.

The following are mentioned as component of the polymer which forms an optically anisotropic melt phase as mentioned above:

(A) at least one member selected from aromatic dicarboxylic acid compounds and alicyclic dicarboxylic acid compounds.

(B) at least one member selected from aromatic hydroxycaboxylic acid compounds;

(C) at least one member selected from aromatic diols, alicyclic diols and alicyclic diol compounds;

(D) at least one member selected from aromatic diols, aromatic thiophenols and aromatic thiolcarboxylic acid compounds;

(E) at least one member selected from aromatic hydroxyamines and aromatic diamine compounds.

These components may be used each alone, but in many cases used in combination like (A)-(C), (A)-(D), (A)-(B)-(D), (A)-(B)-(E), or (A)-(B)-(C)-(E).

As examples of aromatic dicarboxylic acid compounds (A1) are mentioned aromatic dicarboxylic acids such as terephathalic acid, 4,4'-diphenyldicarboxylic acid 4,4'-triphenyldicarboxylic acid, 2,6-naphthalenedicarboxylic acid, 1,4-naphathalenedicarboxylic acid, 2,7-naphthalenedicarboxylic acid, diphenyl ether-4,4'-dicaboxylic acid, diphenoxyethane-4,4'-dicarboxylic acid, diphenoxybutane-4,4'-dicarboxylic acid, diphenylethane-4,4'-dicarboxylic acid, isophthalic acid, diphenyl ether-3,3'-dicarboxylic acid, diphenoxyethane-3,3'-dicarboxylic acid, diphenylethane-3,3'-dicarboxylic acid and 1,6-naphthalenedicarboxylic acid, as well as alkoxy- or halogen-substituted compounds thereof such as chloroterephthalic acid, dichloroterephathalic acid, bromoterephthalic acid, methylterephthalic acid, ethylterephthalic acid, methoxyterephthalic acid and ethoxyterephthalic acid, As examples of alicyclic dicarboxylic acids (A2) are mentined such alicyclic dicarboxylic acids as trans-1,4-cyclohexanedicarboxylic acid, cis-4,4-cyclohexanedicarboxylic acid and 1,3-cyclohexanedicarboxylic acid, as well as alkyl-, alkoxy- or halogen substituted compounds thereof such as trans-1,4-(2,-methyl) cyclohexanedicarboxylic acid and trans-4,-(2-chloro) cyclohexanedicarboxylic acid.

As examples of aromatic hydroxycarboxylic acid compounds (B) are mentioned aromatic hydroxycarboxylic acids such as 4-hydroxybenzoic acid, 3-hydroxybenzoic acid, 6-hydroxy-2-naphthoic acid and 6-hydroxy-1-naphthoic acid, as well as alkyl-, alkoxy- or halogen-substituted compounds thereof such as 3-methyl-4-hydroxybenzoic acid, 3,5-dimethyl-4-hydroxybenzoic acid, 2,6-dimethyl-4-hydroxybenzoic acid, 3-methoxy-4-hydroxybenzoic acid, 3,5-dimethoxy-4-hydroxybenzoic acid, 6-hydroxy-5-methyl-2-naphthoic acid, 6-hydroxy-5-methoxy-2-naphthoic acid, 2-chloro-4-hydroxybenzoic acid, 3-chloro-4-hydroxybenzoic acid, 2,3-dichloro-4-hydroxybenzoic acid, 3,5-dichloro-4-hydroxybenzoic acid, 2,5-dichloro-4-hydroxybenzoic acid, 3-bromo-hydroxybenzoic acid, 6-hydroxy-5-chloro-2-naphthoic acid, 6-hydroxy-7-chloro-2-naphthoic acid and 6-hydroxy-5,7-dichloro-2-naphthoic acid.

As examples of aromatic diols (C1) are mentioned such aromatic diols as 4,4'-dihydroxydiphenyl, 3,3'-dihydroxydiphenyl, 4,4'-dihydroxytriphenyl, hydroquinone, resorcin, 2,6-naphthalenediol, 4,4'-dihydroxydiphenyl ether, bis(4-hydroxyphenoxy)ethane, 3,3'-dihydroxydiphenyl ether, 1,6-naphthalenediol, 2,2-bis(4-hydroxyphenyl)propane and bis(4-hydroxyphenyl)methane, as well as alkyl-, alkoxy- or halogen-substituted compounds thereof such as chlorohydroquinone, methylhydroquinone, t-butylhydroquinone, phenylhydroquinone, methoxyhydroquinone, phenoxyhydroquinone, 4-chlororesorcin and 4-methylresorcin.

As examples of alicyclic diols (C2) are mentioned such alicyclic diols as trans-1,4-cyclohexanediol, cis-1,4-cyclohexanediol, trans-1,4-cyclohexanedimethanol, cis-1,4-cyclohexanedimethanol, trans-1,3-cyclohexanediol, cis-1,2-cyclohexanediol and trans-1,3-cyclohexanedimethanol, as well as alkyl-, alkoxy- or halogen-substituted compounds thereof such as trans-1,4-(2-methyl)cyclohexanediol and trans-1,4-(2-chloro) cyclohexanediol.

As examples of alicyclic diols (C3) are mentioned straight chain or branched aliphatic diols such as ethylene glycol, 1,3-propanediol, 1,4-butanediol and neopentyl glycol.

As examples of aromatic diols (D1) are mentioned benzene-1,4-diol, benzene-1,3-diol, 2,6-naphthalene-diol and 2,7-naphthalene-diol.

As examples of aromatic mercaptocarboxylic acids (D2) are mentioned 4-mercaptobenzoic acid, 3-mercaptobenzoic acid, 6-mercapto-2-naphtoic acid and 7-mercapto-2-napthoic acid.

As example of aromatic mercaptophenols (D3) are mentioned 4-mercaptophenol, 3-mercaptophenol and 6-mercaptophenol.

As examples of aromatic hydroxyamines and aromatic diamine compounds are mentioned 4-aminophenol, N-methyl-4-aminophenol, 1,4-phenylenediamine, N-methyl-1,4-phenylenediamine, N,N'-dimethyl-1,4-phenylenediamine, 3-aminophenol, 3-methyl-4-aminophenol, 2-chloro-4-aminophenol, 4-amino-1-naphthol, 4-amino-4'-hydroxydiphenyl, 4-amino-4'-hydroxydiphenyl ether, 4-amino-4'-hydroxydiphenylmethane, 4-amino-4'-hydroxydiphenyl sulfide, 4,4'-diaminophenyl sulfide(thiodianiline), 4,4'-diaminophenylsulfone, 2,5-diaminotoluene, 4,4'-ethylenedianiline, 4-4'diaminodiphenoxyethane, 4,4'-diaminodiphenylmethane (methylenedianiline) and 4,4'-diminodiphenyl ether (hydroxydianiline).

The themotropic liquid crystal polymer used in the present invention can be prepared by any of various ester forming methods such as, for example, a melt acidolysis method or a slurry polymerization method, using the components exemplified above.

Examples of the thermotropic liquid crystal polymer used in the present invention include polymers wherein part of one high molecular chain is constituted by a polymer segment which forms an anisotropic melt phase and the remaining portion is constituted by a thermoplastic resin segment which does not form an anisotropic melt phase, as well as a composite of plural thermotropic liquid crystal polymers. Preferred examples are (co)polymers containing at least monomer unit represented by the following general formula:

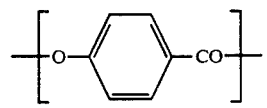

The following are more concrete examples:

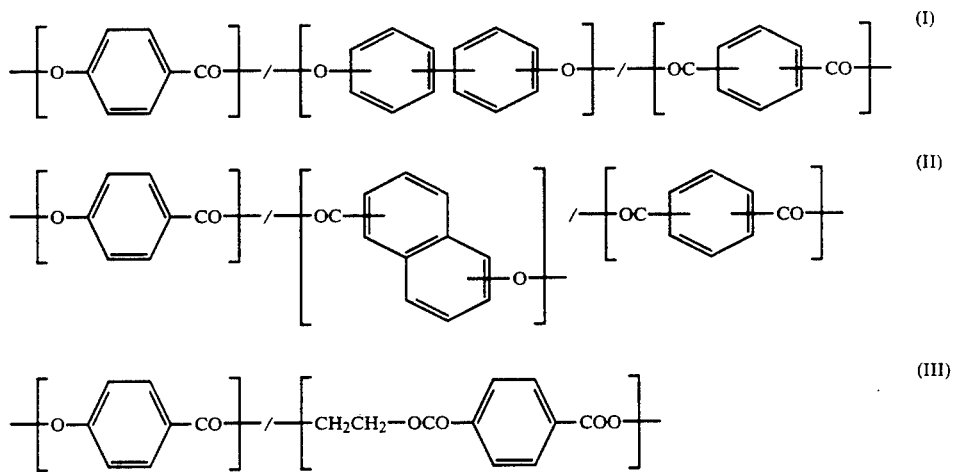

Additive may be incorporated in the thermotropic liquid crystal polymer in a scope not departing from the gist of the present invention to improve such properties as strength, heat resistance and moldability. Inorganic materials are preferred as additives. Examples are molybdenul disulfide, talc, mica, clay, sericite, calcium carbonate, calcium silicate, silica, alumina, aluminum hydroxide, calcium hydroxide, graphite, potassium titanate, glass fibers, carbon fibers and various whiskers. Above all, glass fibers and carbon fibers are preferred. These fibers are used in the form of powder, short fiber, medium fiber, long fiber (e.g. roving, tow, yarn), woven or non-woven fabric, or in a unidirectionally clothwise arranged form.

The additives content in the thermotropic liquid crystal polymer is preferably in the range of 10 to 60 wt %. If it is less than 10 wt %, the addition of the additives will not be fully effective, while their content exceeding 60 wt % will rather result in deteriorated strength and is thus not suitable for the object of present invention.

No special limitation is placed on the shape and structure of the muffler according to the present invention. For example, the muffler has a basic structure comprising an outer shell, an inlet pipe, an outlet pipe and mirror plates. The outer shell of the muffler may be of a conventional shape such as, for example, a cylindrical, elliptical or prismatic shape. How to produce the outer shell is not specially limited, but preferably it is produced by injection molding, extrusion, or thermoforming. Where the additives are used in the form or long fibers (e.g. roving, tow, or yarn), woven or non-woven fabric, or in a unidirectionally clothwise arranged form, there may be adopted a known technique for obtaining a composite material such as a method wherein the additive is pre-impregnated with the thermotropic liquid crystal polymer, wound round a mold and then subjected to thermoforming, or a method wherein the additive and film or sheet of the thermotropic liquid crystal polymer are laminated together and then subjected to thermoforming, or a method wherein mixture of the additive with fibers of the thermotropic liquid crystal polymer is subjected to thermoforming.

The outer shell may be a single layer of the thermotropic liquid crystal polymer or of a multilayer structure comprising a first layer of the thermotropic liquid crystal polymer and a second layer of another structural material, e.g. a metal such as stainless steel.

In order to further improve the muffling performance of muffler, the muffler of the present invention may include a structure generally used for mufflers such as the provision of a partition wall, resonance holes and an expansion chamber.

Further, a fibrous or porous sound absorbing material may be mounted or charged into the muffler. If desired, the outer shell may be lined with a heat insulating material, although against ordinary exhaust gases it is not necessary to stick a heat insulating material on the inner surface of the outer shell.

The present invention will now be described with reference to the drawings. FIG. 1 is a sectional view showing an example of a muffler according to the present invention. The muffler comprises an outer shell 1, an inlet pipe 2, an outlet pipe 3, mirror plates 4a, 4b and a space 5. The outer shell 1 is formed of the thermotropic liquid crystal polymer used in the present invention. The exhaust gas from a combustor is introduced through the inlet pipe 2 into the space 5, where it expands, then passes through the outlet pipe 3 and is discharged into the atmosphere.

The thermotropic liquid crystal polymer used for the outer shell of the muffler of the present invention has an extremely high heat deformation temperature, which is not lower than 300° C., and its thermal expansion is to a small extent, so it is scarcely deteriorated and has a long life even under the repetition of heat stress. Moreover, since the liquid crystal polymer is superior also in point of strength, it is possible to reduce the wall thickness and hence the weight of the outer shell. Further, the thermotropic liquid crystal polymer is highly resistant to corrosion caused by exhaust gas and so has a long life; besides, it possesses a vibration damping property and so exhibits an excellent noise muffling effect.

The present invention will be described below in terms of working examples thereof.

EXAMPLE 1

Using RC-210 (trade name, a product of, U.A.S.) comprising a terpolymer a terpolymer of parahydroxybenzoic acid, biphenol and terephthalic acid, with 30 wt % of glass fibers incorporated therein, as the thermotropic liquid crystal polymer, two semi-cylindrical parts were fabricated by injection molding. The semi-cylindrical parts were combined together into a cylindrical form (200 mm dia. × 300 mm) to obtain an outer shell of a muffler. The outer shell was placed in an electric oven and subjected to a heat test at a constant temperature of 350° C. for 1,000 hours in a nitrogen gas atmosphere.

As a result, there was observed little change on the surface of the outer shell. Also, blistering and heat deformation were scarcely observed.

EXAMPLE 2

Using the outer shell obtained in Example 1, there was fabricated a muffler of such a structure as shown in FIG. 1, comprising metallic (stainless steel) inlet pipe 2, outlet pipe 3 and mirror plates 4a, 4b. Hot air held at 400° C. was fed into the inlet pipe 2 of the muffler for 6 hours at a flow rate of 0.5 m²/min to test the heat resistance of the outer shell.

After the test, the muffler was disassembled and the inner surface of the outer shell observed; as a result, blistering and surface change were scarcely observed.

EXAMPLE 3

The muffler obtained in Example 2 was attached to a water-cooled, 1.5 L, four-cylinder, four-cycle gasoline engine and the noise of the exhaust gas from the muffler outlet pipe was measured by an ordinary sound level meter (JIS-C1052) through a noise measuring microphone. The microphone was placed in a position 50 cm in a 45-deg. direction outwards from the outlet pipe at the same height as the outlet pipe. FIG. 2 shows the relation between the engine speed (rpm) and the whole noise level (ad(A)) at a constant engine output of 22 KW.

COMPARATIVE EXAMPLE

A steel muffler having the same shape as that in Example 2 was attached to a water-cooled, 1.5 L, four-cylinder, four-cycle gasoline engine, and the relation between the engine speed (rpm) and the whole noise level (ab(A)) was determined in the same manner as in Example 3. The results are as shown in FIG. 2.

Figure 1:
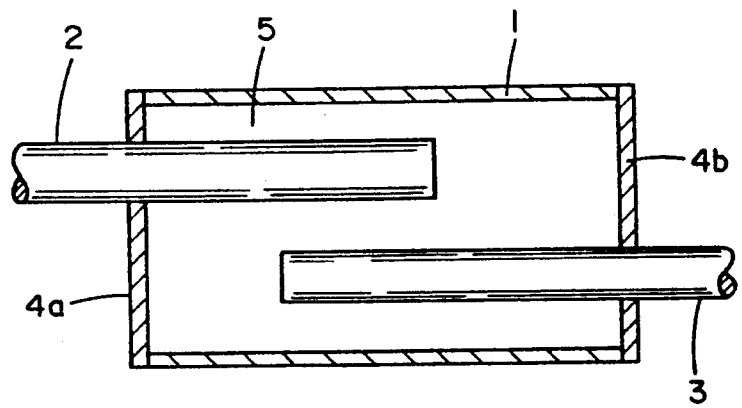
FIG. 1 is a sectional view showing an example of a muffler according to the present invention.
Figure 2:
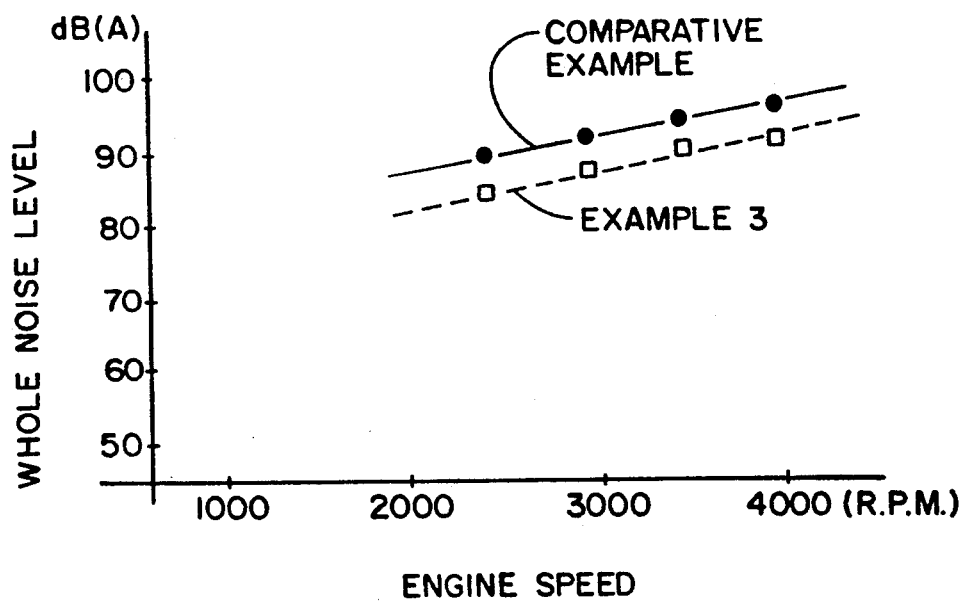
FIG. 2 is a graph showing the relation between the engine speed (rpm) and the whole noise level (ad(A)).

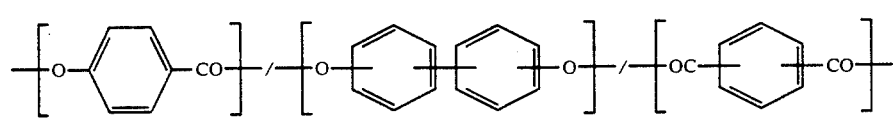
or,
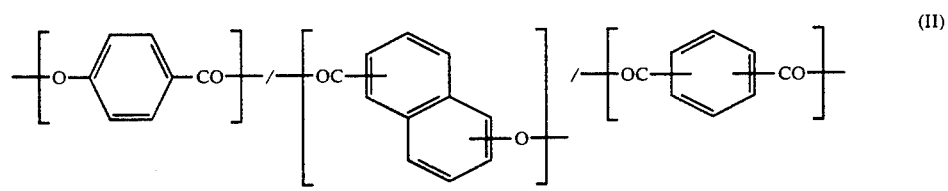

What is claimed is:

1. In a muffler of the type comprising an outer shell, an inlet pipe, an outlet pipe, mirror plates and a space containing sound absorbing material; the improvement comprising said outer shell formed from a thermotropic liquid crystal polymer.

2. A muffler as set forth in claim 1 wherein said thermotropic liquid crystal polymer is an all aromatic polyester containing a monomer unit represent ed by the following general formula:

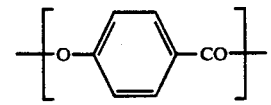

3. A muffler as set forth in claim 1 or claim 2, wherein said thermotropic liquid crystal polymer contains 10% to 60% by weight of an inorganic additive.

4. A muffler as set forth in claim 3, wherein said inorganic additive is at least one member selected from the group consisting of glass fibers and carbon fibers.

5. The muffler of claim 1 wherein said thermotropic liquid crystal polymer is an all aromatic polyester containing a monomer unit chosen from